(No Model.) 3 Sheets—Sheet 1.

O. B. PECK.
CENTRIFUGAL SEPARATOR.

No. 560,630. Patented May 19, 1896.

Witnesses:
Clifford N. White
R H Garman

Inventor:
Orrin B. Peck (No Model.) 3 Sheets—Sheet 2.

O. B. PECK.
CENTRIFUGAL SEPARATOR.

No. 560,630. Patented May 19, 1896.

Witnesses:
Clifford N. White,
R. H. Garman

Inventor:
Orrin B. Peck.

(No Model.)   3 Sheets—Sheet 3.
O. B. PECK.
CENTRIFUGAL SEPARATOR.
No. 560,630.   Patented May 19, 1896.
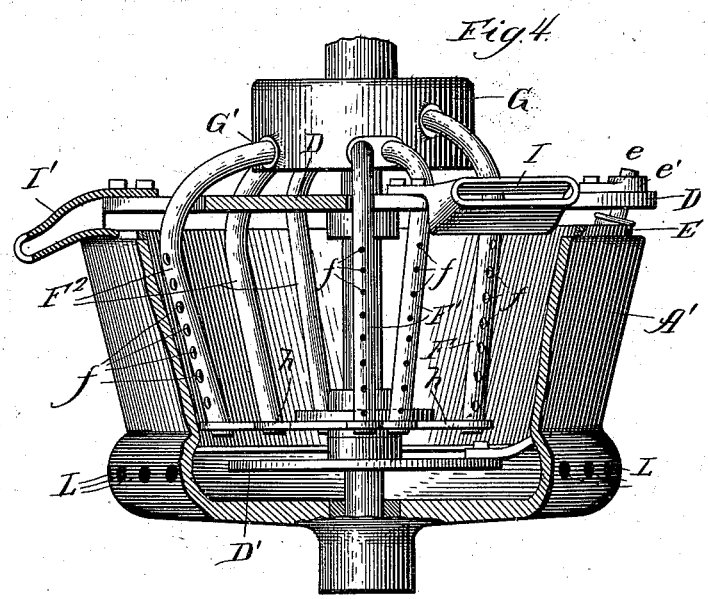
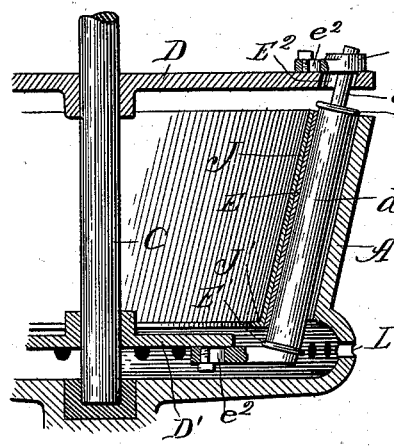
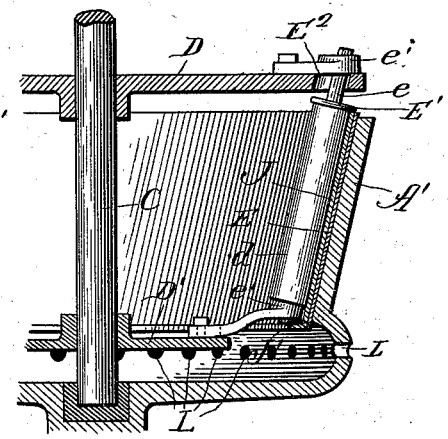
Witnesses:
Inventor:
Orrin B. Peck

UNITED STATES PATENT OFFICE.

ORRIN B. PECK, OF CHICAGO, ILLINOIS, ASSIGNOR TO MELINDA PECK, OF SAME PLACE.

CENTRIFUGAL SEPARATOR.

SPECIFICATION forming part of Letters Patent No. 560,630, dated May 19, 1896.

Application filed March 28, 1894. Serial No. 505,420. (No model.)

*To all whom it may concern:*

Be it known that I, ORRIN B. PECK, a citizen of the United States, residing at Chicago, in the county of Cook and State of Illinois, have invented a new and useful Improvement in Centrifugal Separators, of which the following is a specification.

My improvement relates more particularly to centrifugal ore-separators, the principal object being to provide a machine having a a flexible separating-surface capable of being deflected toward and from the axis of rotation upon which the material under treatment is continuously separated and separately discharged therefrom. I attain this object by the mechanism illustrated in the accompanying drawings, in which—

Figure 1:
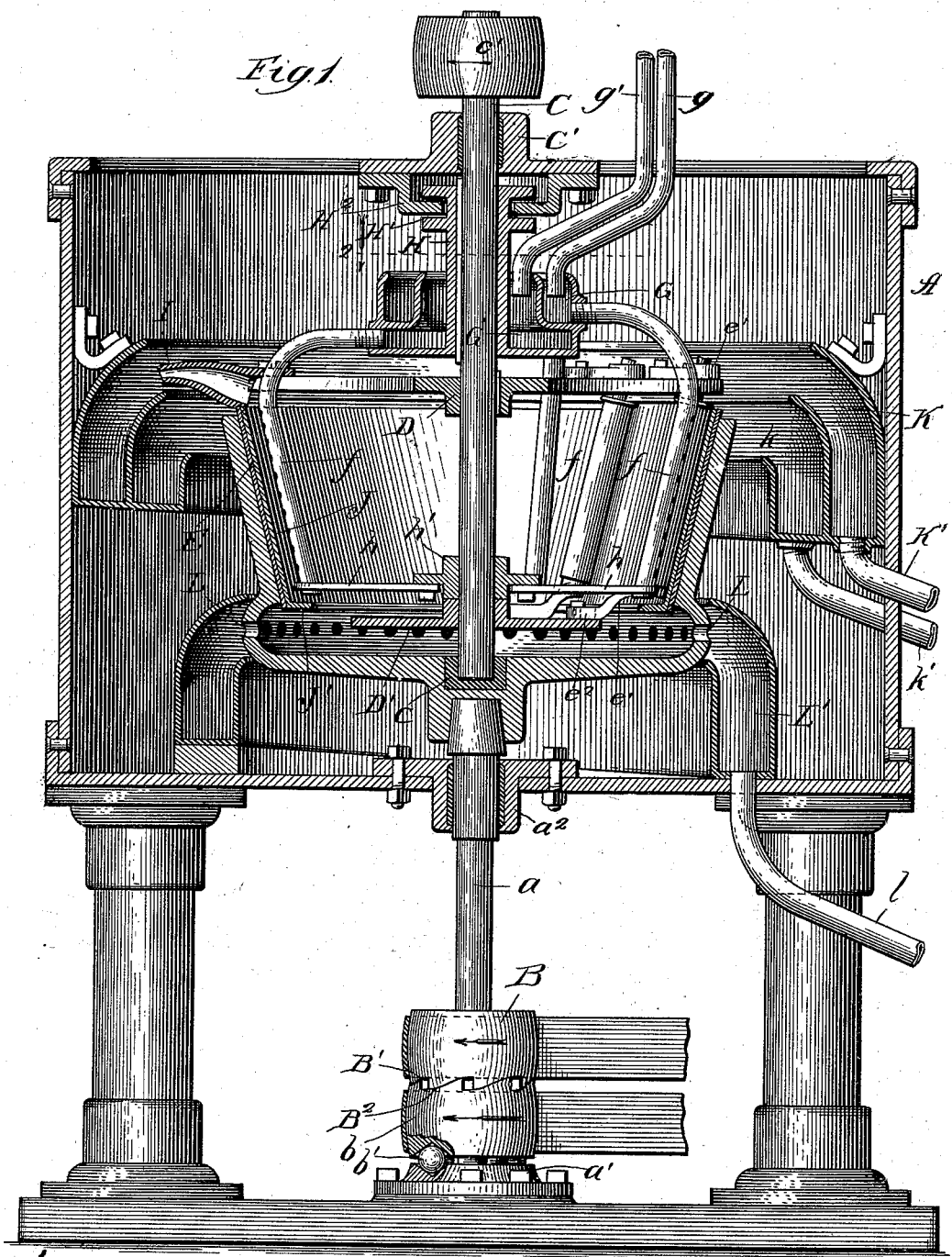
Figure 2:
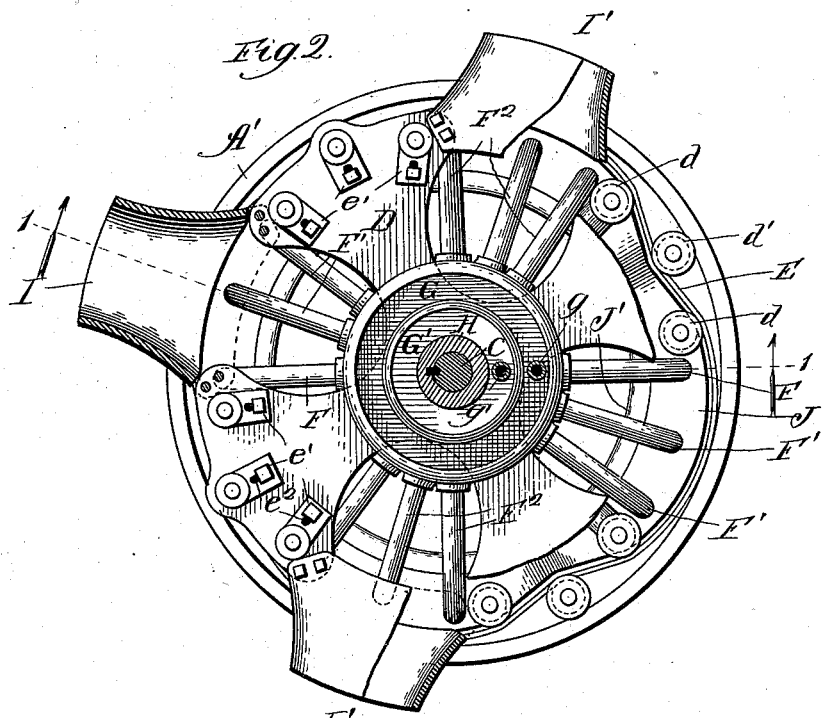
Figure 3:
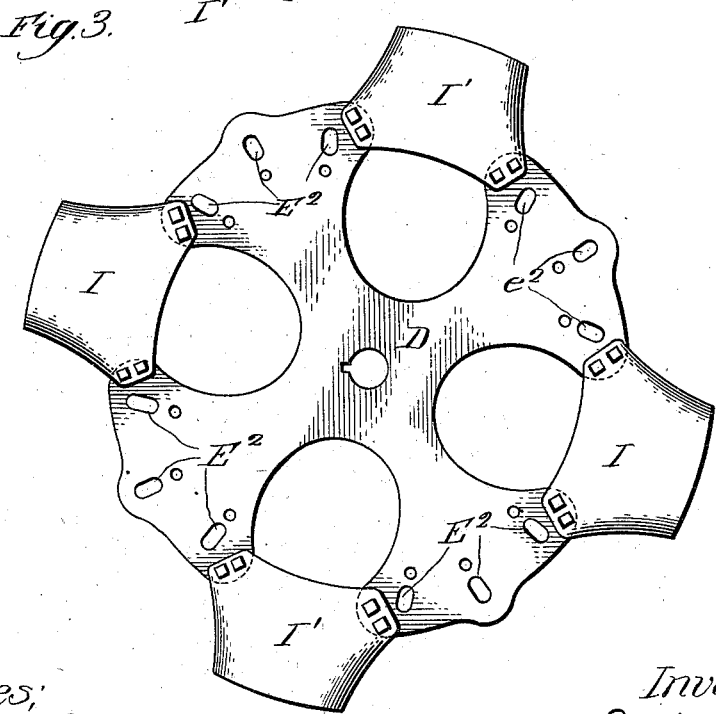

Figure 1 is a vertical section of the machine on the line 1 of Fig. 2. Fig. 2 is a sectional plan view on the line 2 of Fig. 1, parts being removed and broken away. Fig. 3 is a top plan view of the upper roll-supporting plate. Fig. 4 is a partial elevation, parts of the outer vessel and separating-belt being broken away. Fig. 5 is a sectional detail showing one of the outer belt-supporting rolls, and Fig. 6 is a similar view showing one of the inner belt-supporting rolls. All sections are taken in the direction indicated by the arrows.

Like letters refer to like parts throughout the several views of the drawings.

A designates a suitably-supported inclosing casing, in which is located the rotatable vessel A' upon the upper end of a vertical shaft $a$. This shaft is stepped at its lower end in a bearing $a'$ and is supported at its upper end by a bearing $a^2$ in the bottom of the casing. It is rotated by a pulley B, driven by a belt from a suitable counter-shaft. On the lower surface of the pulley B are a series of cam-surfaces or inclines B', resting on and registering with like cam-surfaces B² upon the upper surface of a loose pulley $b$ on shaft $a$, preferably supported by a series of balls $b'$, resting in channels in the lower surface of the pulley and upper surface of the step-bearing $a'$. This pulley is rotated in the same direction as pulley B, but at a different rate of speed, by a belt to the main counter-shaft or otherwise. As these cam-surfaces rotate by one another a series of sharp shocks or vibrations are imparted to the vessel and the parts which it supports by the upward movement of the shaft and its sudden descent by gravity. By varying the speed of rotation of the pulley $b$ the frequency of these shocks may be varied as desired irrespective of the speed of rotation of the vessel.

C designates a shaft, the upper end of which is journaled at C' in the top of the casing and supported at its lower end in a step-bearing $c$ in the bottom of the vessel A'. It is rotated at the desired speed by a pulley $c''$, belted to the counter-shaft. Upon this shaft are fixed an upper and lower supporting-plate D D', which carry a series of sets, preferably four in number, of three rolls $d$ $d$ and $d'$, upon which is supported a flexible separating belt or band E of light sheet metal or other suitable material which constitutes the separating-surface, this belt passing continuously around the interior wall of the vessel, under the rolls $d$ $d$, between them and the vessel, and over the rolls $d'$, all of which extend in a direction substantially transverse of said belt. Thus the separating-surface is deflected toward and from the axis of rotation in a series of substantially sinusoidal curves or waves, while at the same time the belt is held by the inner rolls $d$ $d$ and by centrifugal force in frictional contact with the inner surface of the rotating vessel for the purpose of causing the travel of said belt, giving it a simple rotary motion about a central axis. At the top and bottom of roll $d'$ and at the top of roll $d$ are projecting flanges E', which serve to retain the belt in place on the rollers. The roll-shafts $e$ pass through slots E² in the upper supporting-plate and are journaled in movable bearings $e'$, secured to said plate by set-screws passing through a slot $e^2$ in an ear extending from said bearings, the lower roll-shaft bearing being similarly secured to the lower supporting-plate. By this means the rolls may be adjusted for position and inclination and the frictional contact of the belt with the surface of the rotatable vessel varied as desired.

Upon the inner or separating surface of the separating-belt is placed a lining or covering J of yieldable or elastic material, preferably rubber, for the purpose of protecting said surface from the wear and attrition of the material. Upon the lower edge of this covering is an inwardly-projecting annular flange J', which aids in retaining the material under treatment upon the separating-surface. The covering may be renewed as worn and may, if desired, be entirely omitted.

At opposite points of the separating-surface and at one side of a portion of the wave which is farthest from the axis of rotation, or, as it might be termed, the "trough," extends transversely thereof a material-feeding pipe F, and in the same section of the wave, between the rolls $d$ $d$, are two sets of pipes F' F', which deliver against or toward the separating-surface comparatively light jets of a liquid, preferably water, for the purpose of washing away lighter material. In each of the next or intermediate troughs are a set of three liquid-feeding pipes $F^2$, which discharge a more heavy spray against the separating-surface for the purpose of removing heavier material. The material and liquid are ejected or sprayed from these pipes by vertically-disposed rows of orifices $f$, those in pipes $F^2$ being preferably larger in diameter than those in pipe F' to secure increased liquid impact or aqueous force. These pipes or conduits are supplied with material and liquid, respectively, from a double annular trough made in two sections G G', from which said pipes extend, material and water being supplied thereto from a suitable source by the pipes $g$ $g'$. This trough and the pipes which deliver therefrom are secured to the shaft C by a spline and groove to rotate therewith, but are held against the vertical movement imparted to the shaft by the cam-surfaces B' and $B^2$ by an upwardly-extending sleeve H, which surrounds said shaft and has at its upper extremity an annular groove H', formed by two projecting flanges. This groove embraces an annular flange $H^2$ upon a circular plate secured to the top of the casing.

The lower ends of the pipes F F' $F^2$ are supported by bars $h$, secured at their inner ends to a collar $h'$, loose on the shaft C and resting upon the upper surface of the lower supporting-plate D'. The upper plate D is cut away in the portions between the rolls, and at these points are supported two sets of discharge-pipes I I and I' I', bolted to the edges of said plate. The spouts I I, which are opposite the portion of the belt upon which the material is fed and the lighter spray delivered, extend in such a plane as to deliver the material passing through them into an annular inclined trough K surrounding the vessel, which has at its lower point a discharge-pipe K'. The spouts I' I', opposite the portion of the treatment vessel subjected to the heavier spray, are inclined downward into a lower horizontal plane and deliver into an annular trough $k$ concentric with the first, from which a pipe $k'$ discharges the material. In the lower part of the treatment vessel are a series of orifices L, discharging into an annular trough L', which is emptied by pipe $l$.

The operation of the device is as follows: The separating-belt is caused to travel at a speed sufficient to develop the intensity of centrifugal force desired by the rotation of the outer vessel, with which it is forced into frictional contact by the rolls $d$ $d$. As these rolls and their companion rolls $d'$ travel at a different speed than the vessel, preferably more slowly, the belt by its contact with the wall of the vessel will be caused to travel more rapidly than the rolls, which will therefore pass over it, deflecting it toward and from the axis of rotation and causing it to assume the continuous wave form or substantially sinusoidal curve. At one side of a trough of this wave and at opposite points of the vessel the material in a finely-divided state, mingled with the proper amount of liquid, preferably water, is fed into the trough G and is thrown against the separating-surface through the orifices in the pipes F F. Here it is separated by the action of centrifugal force, assisted by the vibration imparted to the separating-surface acting through the rotatable vessel and the supporting-rolls, and heavier material is precipitated upon said surface and in a layer nearest thereto, while the lighter is washed away by the comparatively gentle spray of liquid from the orifices in pipes F' F' and discharged by the spouts I I into the trough K, from which it is conducted away. The rolls $d$ $d$ serve to assist in retaining the lighter material between them while it is being sprayed by pipes F' F' and prevent its being carried along by the belt with the heavier material. As the belt travels the heavier material passes under the first of rolls $d$ and is carried over the crest of the wave, the reflex curve of the separating-surface in a measure loosening the material and preparing it for more ready discharge. It then passes under the second of the rolls $d$ and again into the trough of the wave, where it is subjected to the heavier impact of the larger jets of liquid from the pipes $F^2$ $F^2$ $F^2$, which washes it through the spouts I' I' into the trough $k$, from which it is conducted to a separate receptacle. During this time material is being constantly introduced and separated, so that the operation goes on continuously and simultaneously over two portions of the separating-surface. If desired, however, it might be divided into three or more portions by increasing the length of the separating-belt and the sets of rolls and pipes. As the material and liquid feeding pipes are held against the vertical movement the rise and fall of the separating-surface incident to the vibration causes said surface to travel vertically back and forth by the orifices in said pipes, and when such movement is sufficient distributing the material uniformly on the entire width of the belt and exposing the whole of the material to the action of the liquid jets. The excess of liquid, carrying with it some lighter material, falls to the bottom of the vessel and is discharged through the orifices L into the trough L' and conducted away.

Though the term "vessel" has been used throughout to designate the part A', its functions do not necessitate its being such in a technical sense, as simply the upper or cylindrical portion might be used, if desired.

When metal is used for the separating-belt, the angularity of its path of travel is not sufficiently great to prevent its ready deflection toward and from the axis of rotation.

It is obvious that many changes and modifications in the details of construction of the various parts of the mechanism herein described may be made as desired by the constructor or to best suit the varied conditions under which the machine is operated without departing from my invention.

What I claim as my invention, and desire to secure by Letters Patent, is—

1. In a centrifugal separator, the combination of a rotatable, flexible separating-surface, and means traveling circumferentially in contact with the same and at a different speed therefrom for deflecting portions of said surface toward and from the axis of rotation, substantially as described.

2. In a centrifugal separator, the combination of a rotatable, flexible separating-surface, means traveling circumferentially in contact with the same and at a different speed therefrom for deflecting portions of said surface toward and from the axis of rotation, means for delivering material for separation and the discharge of lighter substances by liquid forces on one portion of the separating-surface, and means for subjecting the heavier material to increased liquid force on another portion thereof to effect its removal, substantially as described.

3. In a centrifugal separator, the combination of the rotatable, flexible separating-surface, and rolls traveling circumferentially in contact with the same and at a different speed therefrom for deflecting portions of said surface toward and from the axis of rotation, substantially as described.

4. In a centrifugal separator, the combination of a rotatable, flexible separating-surface, and rolls traveling at a different speed therefrom within and without said surface and located transversely thereto for deflecting portions of the same toward and from its axis of rotation, substantially as described.

5. In a centrifugal separator, the combination of a flexible separating-surface, means for supporting and rotating the same, and rolls traveling at a different speed therefrom within and without such surface for deflecting portions thereof toward and from its axis of rotation, substantially as described.

6. In a centrifugal separator, the combination of a light, metallic, flexible separating-belt, mounted for movement over its supports and means traveling circumferentially in the path of rotation of the separating-surface and at a different speed therefrom for deflecting portions of said belt toward and from its axis of rotation, substantially as described.

7. In a centrifugal separator, the combination of a light, metallic, flexible separating-belt provided with a lining or covering, and means traveling at a different speed therefrom for deflecting portions of said belt toward and from its axis of rotation, substantially as described.

8. In a centrifugal separator, the combination of a metallic, spring-belt, mounted for movement over its supports and means traveling circumferentially in the path of rotation of the separating-surface and at a different speed therefrom for deflecting portions of said belt toward and from its axis of rotation, substantially as described.

9. In a centrifugal separator, the combination of a flexible separating-belt, rotatable means in contact therewith for moving the same by frictional contact, and means traveling at a different speed therefrom for deflecting portions of such surface toward and from its axis of rotation, substantially as described.

10. In a centrifugal separator, the combination of a flexible separating-belt located within a vessel which assists in supporting the same, and rotating it by frictional contact, and means traveling at a different speed therefrom for deflecting portions of said surface toward and from its axis of rotation, substantially as described.

11. In a centrifugal separator, the combination of a rotatable, flexible separating-surface, and independently-adjustable revolving rolls for deflecting portions of said surface toward and from its axis and traveling circumferentially in the path of rotation, substantially as described.

12. In a centrifugal separator, the combination of a rotatable, flexible separating-surface, means traveling circumferentially in the path of rotation of the separating-surface, in contact therewith and at a different speed therefrom, for deflecting portions of said surface toward and from its axis of rotation and at the same time preventing the remingling of the separated lighter and heavier materials.

13. In a centrifugal separator, the combination of a rotatable, flexible separating-surface, and rotatable spouts for receiving and delivering heavier and lighter substances separately as discharged therefrom, substantially as described.

14. In a centrifugal separator, the combination of a rotatable separating-surface, and vibratable rolls operating in contact therewith, substantially as described.

15. In a centrifugal separator, the combination of a rotatable separating-surface, and vibratable means for deflecting portions thereof toward and from the axis of rotation, substantially as described.

16. In a centrifugal separator, the combination of a rotatable separating-surface, rolls for deflecting portions thereof toward and from the axis of rotation, and means for vibrating said rolls, substantially as described.

17. In a centrifugal separator, the combination of a rotatable separating-surface, and revolving rolls traveling circumferentially in the path of rotation and operating in contact with said separating-surface for deflecting the same in a continuous series of waves, substantially as described.

18. In a centrifugal separator, the combination of a rotatable separating-surface, and vibratable rolls approximately transverse to said surface for deflecting the same in a series of waves continuously throughout the circumference, substantially as described.

19. In a centrifugal separator, the combination of a rotatable separating-surface, rolls operating in contact therewith for deflecting said surface toward and from the axis of rotation in a continuous wave traveling around its circumference, and conduits traveling with such waves for supplying material on one portion of the separating-surface, and jets of liquid to effect the removal of heavier substances from another portion thereof, substantially as described.

20. In a centrifugal separator, the combination of a rotatable separating-surface, vibratable rolls approximately transverse thereto for deflecting said surface toward and from the axis of rotation in a continuous wave traveling around its circumference, and means traveling with such wave for supplying material on one portion of the separating-surface, and to effect the removal of heavier substances from another portion thereof, substantially as described.

21. In a centrifugal separator, the combination of a rotatable separating-surface, rolls operating in contact therewith for deflecting said surface toward and from the axis of rotation in a continuous wave traveling around its circumference, means for traveling with such waves for supplying material on one portion of the separating-surface, and to effect the removal of heavier substances from another portion thereof, and a revolving spout to receive the heavier or lighter substances as discharged from the separating-surface, substantially as described.

22. In a centrifugal separator, the combination of a rotatable separating-surface having the form of a continuous series of waves during the operation, conduits traveling with the troughs of the waves for delivering material at two or more points about its circumference, and means between said points for separating and separately discharging heavier and lighter material before it reaches the next point of feed, substantially as described.

23. In a centrifugal separator, the combination of a rotatable separating-surface, means traveling at a different speed therefrom for deflecting said surface toward and from the axis of rotation, pipes or conduits traveling therewith for delivering material at two or more points about the circumference of the separating-surface, and means between said points for separating and separately discharging the heavier and lighter material from the surface before it reaches the next point of feed, substantially as described.

24. In a centrifugal separator, the combination of a rotatable separating-surface, rolls operating in contact therewith for deflecting said surface in a continuous series of waves, pipes or conduits traveling with the troughs of such waves for delivering material at two or more points, and means between said points for separating and revolving separately discharging heavier and lighter material from the surface before it reaches the next point of feed, substantially as described.

ORRIN B. PECK.

Witnesses:
M. L. ALLEN,
R. H. GARMAN.

Correction in Letters Patent No. 560,630.

It is hereby certified that Letters Patent No. 560,630, granted May 19, 1896, upon the application of Orrin B. Peck, of Chicago, Illinois, for an improvement in "Centrifugal Separators," were erroneously issued to Melinda Peck as sole owner of the invention; whereas said Letters Patent should have been issued to *The Patent Title Company, of same place*, said The Patent Title Company being assignee, by mesne assignments, of the entire interest in said invention, as shown by the assignments of record in this Office; and that the said Letters Patent should be read with this correction therein that the same may conform to the record of the case in the Patent Office.

Signed, countersigned, and sealed this 23d day of June, A. D. 1896.

[SEAL.]

JNO. M. REYNOLDS,
*Assistant Secretary of the Interior.*

Countersigned:
   S. T. FISHER,
     *Acting Commissioner of Patents.*